(12) United States Patent
Monday et al.

(10) Patent No.: US 6,263,377 B1
(45) Date of Patent: *Jul. 17, 2001

(54) METHOD FOR MANAGING DISTRIBUTED APPLICATIONS AND DISTRIBUTED APPLICATION MANAGER

(75) Inventors: Paul B. Monday; Maurice Allan Zipse, both of Rochester, MN (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/828,373

(22) Filed: Mar. 28, 1997

(51) Int. Cl.[7] ........................................................ G06F 9/54
(52) U.S. Cl. ............................................................ 709/320
(58) Field of Search ............................... 395/712, 200.33, 395/683, 701; 345/334, 333; 709/203, 303, 310–332

(56) References Cited

U.S. PATENT DOCUMENTS

| 4,845,644 | 7/1989 | Anthias et al. ....................... 345/343 |
| 5,519,862 | 5/1996 | Schaeffer et al. ......................... 717/1 |
| 5,548,745 | 8/1996 | Egan et al. ............................. 703/27 |
| 5,572,648 | 11/1996 | Bibayan ................................ 345/340 |
| 5,754,857 | * 5/1998 | Gadol ................................... 709/203 |
| 5,768,510 | * 6/1998 | Gish ..................................... 709/203 |
| 5,862,377 | * 1/1999 | Lee ....................................... 709/329 |
| 5,922,054 | * 7/1999 | Bibayan ................................ 709/328 |
| 6,100,885 | * 8/2000 | Donnelly et al. ..................... 345/333 |

OTHER PUBLICATIONS

Oppen, D C et al. "The Clearinghouse: A decentralized agent for locating named objects in a distributed environment", 1983.*

"ACM Transactions on Office Information Systems" vol. 1, No. 3, pp. 230–253, Jul. 1993.*

John December & Mark Ginsburg "HTML & CGI Unleashed", Sams Net Publishing, 1995.*

(List continued on next page.)

*Primary Examiner*—St. John Courtenay, III
(74) *Attorney, Agent, or Firm*—Joan Pennington

(57) ABSTRACT

A method and computer program product for managing distributed applications on a local computer system, and a distributed application manager are provided. The distributed Application manager running at a local computer system keeps a list of available distributed applications as well as a list of servers from which these distributed applications can be downloaded. The distributed application manager presents a selection screen to the user, containing a list of available distributed applications; and based on a user selection from the list, the distributed application manager searches for the distributed application on a path of servers and a path of directories in each server. When the distributed application manager finds the selected application, it downloads the application from the server, installs the selected application at the local computer system and invokes the application for the user.

12 Claims, 5 Drawing Sheets

OTHER PUBLICATIONS

"HTML & CGI—Unleashed" p. 47 by John December & Mark Ginsburg, 1995.*

Lagoze et al. "Dienst: Implementation Reference Manual", May 1995.*

Davis et al. "A protocol and server for a distributed digital technical report library", May 1995.*

"Two Start–Up Firms Unveil Software To 'Push' Information on the Internet", Oct. 7, 1996, p. B9.

"The Java™ Language: An Overview" http://www.javasoft.com.

"It all started with an angry letter." by Jason English (What is Java?) http://www.javasoft.com.

Marimba, "Castanet" overview; http://www.marimba.com/products/castanet. ntn/.

* cited by examiner

METHOD FOR MANAGING DISTRIBUTED APPLICATIONS AND DISTRIBUTED APPLICATION MANAGER

FIELD OF THE INVENTION

The present invention relates to the data processing field, and more particularly, relates to a method and computer program product for managing distributed applications and a distributed application manager.

DESCRIPTION OF THE PRIOR ART

The ability to install and run an application without an installation utility customized for the application was virtually unheard of until recently. Java Applets run within an appletviewer or a web browser have set a precedence for the invisible insulation of a client applet (tiny application). The browser asks the server to download an applet by name, once the executable code or the class file is downloaded, the applet is free to run within the confines of the Web Browser.

Both Java Applets and Java Applications can run on various client machines without modification to any computing platform, thus saving the costs associated with developing software for multiple platforms. The Java programming language is a simple, object-oriented, network-savvy, interpreted, robust, secure, architecture neutral, portable, high-performance, multithreaded, dynamic language. There are many distinctions between Java Applets and Java Applications. An appletviewer or web browser do not support Java Applications.

A need exists for an effective technique for managing distributed applications. It is desirable to eliminate the need to distribute and/or write an installation program for each separate distributed application.

SUMMARY OF THE INVENTION

Important objects of the present invention are to provide an improved method and computer program product for managing distributed applications and a distributed application manager; and to provide such method and computer program product that eliminates the need to distribute and/or write an installation program for each separate application. Other important objects of the present invention are to provide such improved method, computer program product and distributed application manager substantially without negative effects and that overcome many disadvantages of prior art arrangements.

In brief, a method and computer program product for managing distributed applications on a local computer system, and a distributed application manager are provided. The distributed application manager running at a local computer system keeps a list of available distributed applications as well as a list of servers from which these distributed applications can be downloaded. The distributed application manager presents a selection screen to the user, containing a list of available distributed applications; and based on a user selection from the list, the distributed application manager searches for the selected application on a path of servers and a path of directories in each server. When the distributed application manager finds the selected application, it downloads the application from the server, installs the selected application at the local computer system and invokes the application for the user.

BRIEF DESCRIPTION OF THE DRAWING

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1A:
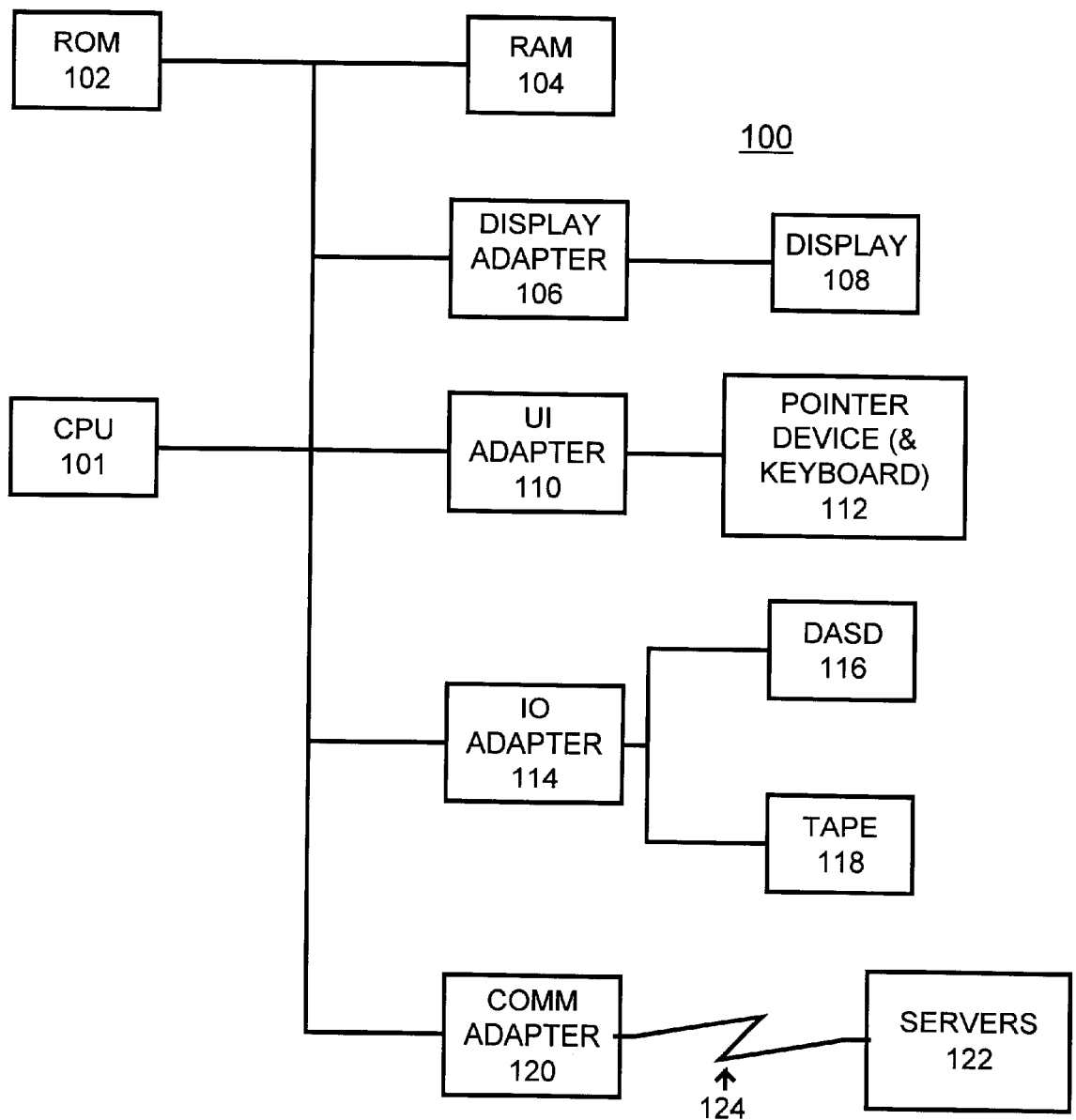
FIGS. 1A and 1B are block diagram representations of a computer or data processing system and of an operation system of the preferred embodiment.
Figure 1B:
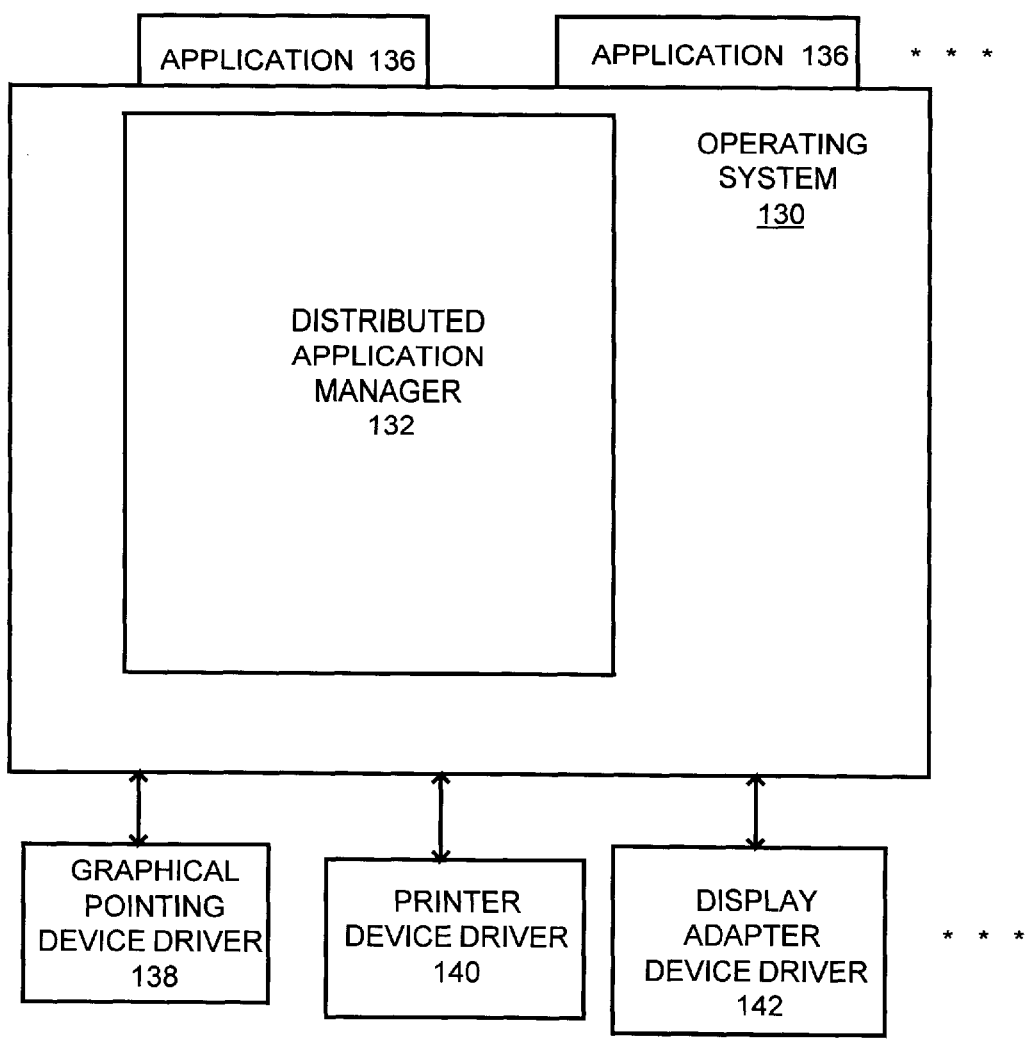

Having reference now to the drawings, in FIGS. 1A and 1B, there is shown a computer or data processing system of the preferred embodiment generally designated by the reference character 100. As shown in FIG. 1A, computer system 100 includes a central processor unit (CPU) 101, a read only memory 102, a random access memory 104, a display adapter 106 coupled to a display 108. CPU 101 is connected to a user interface (UI) adapter 110 connected to a pointer device and keyboard 112. CPU 101 is connected to an input/output (IO) adapter 114 connected to a direct access storage device (DASD) 116 and a tape unit 118. CPU 101 is connected to a communications adapter 120 providing a communications function. A plurality of remote servers 122 (one shown) are connected to the computer system 100 via a network 124.

As shown in FIG. 1B, computer system 100 includes an operating system 130 including a distributed application manager 132 of the preferred embodiment. Multiple applications 136 and multiple device drivers including a graphical pointing device driver 138, a printer device driver 140, and a display adapter device driver 142 are supported by the operating system 130.

Various commercially available processors could be used for computer system 100, for example, an IBM personal computer or similar workstation can be used. Central processor unit 101 is suitably programmed to execute the flowcharts of FIGS. 2, 3 and 4 of the preferred embodiment.

In accordance with features of the preferred embodiment, the distributed applications manager 132 downloads, installs, and keeps up to date distributed applications by running the application from within a wrapper application. The application is downloaded through a network connection via communications adapter 120 and made persistent or stored onto the local computer system 100. Each run of a particular application optionally includes checking the remote site for classes which have been updated between runs. Problems solved by distributed applications manager 132 are that the need to distribute and/or write an installation program for each separate distributed application is eliminated; only the parts necessary to run a particular application are downloaded, minimizing storage requirement within DASD 116; updates to products are automatically downloaded and installed, all applications advantageously conform to JAVA or similar standards so they can be used on any platform, for example, INTERNATIONAL BUSINESS MACHINES OPERATING SYSTEM/2 ("IBM OS/2"), IBM AS/400, and MICROSOFT WINDOWS. "IBM", "OPERATING SYSTEM/2", "IBM OS/2", IBM AS/400 are trademarks of International Business Machines Corporation.

"MICROSOFT" and "WINDOWS" are trademarks of Microsoft Corporation. Servers 122 advantageously are set up as clearing houses for multiple distributed applications.

In accordance with features of the preferred embodiment, the distributed application manager 132 keeps a database of locally installed distributed applications, as well as a list of servers 122 for downloading new distributed applications and updates for locally installed distributed applications. New distributed applications at servers 122 advantageously are provided on a try/buy basis, where classes can be kept in memory 104 and never stored or persisted to DASD 116 of the local computer system 100. New distributed applications also can be provided on a free basis, where classes persisted without payment, or on a charge basis for mirroring a distributed application to DASD 116, for example, using encrypted credit card transmissions for payment. Distributed application manager 132 is easily be customized to Internet usage by adding local servers 122 to a REMOTECLASS-PATH environment variable. By providing local servers 122, installed an AS/400, multiple computer systems 100 connected to a local network 124 can take advantage of new distributed applications or programs without requiring any specialized client install within the computer systems 100.

Distributed application manager 132 provides an aesthetically pleasing or nice looking graphical user interface (GUI) arranged to make the physical location of a particular distributed application seem transparent. The graphical user interface may include a series of folders for a windows platform, while other presentations such as icons, list boxes, or any other format useful with all available platforms are preferred.

Figure 2:
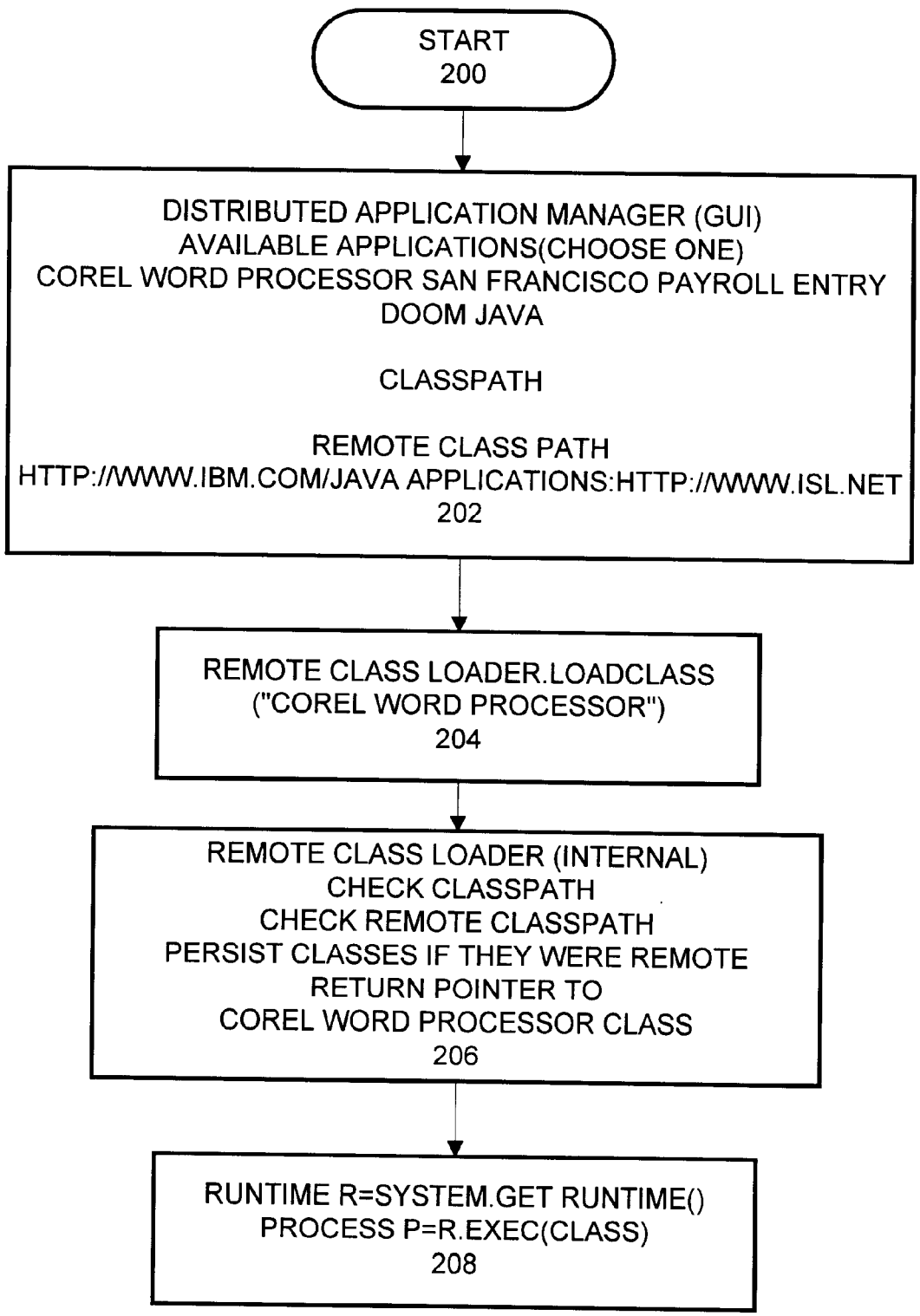
FIG. 2 is a flow chart illustrating exemplary operations of a distributed applications manager of the computer system of FIGS. 1A and 1B.

Referring now to FIG. 2, sequential operations of the distributed application manager 132 start at a block 200. As indicated at a block 202, distributed application manager 132 displays a graphical user interface (GUI) selection screen to the user of available distributed applications to be selected by the user. For example as shown at block 202, the user selects a Corel Word Processor, San Francisco Payroll Entry. The distributed application manager 132 checks the environment variable CLASSPATH for a set of directories to browse for the selected class file, Corel Word Processor, San Francisco Payroll Entry. If the selected x.class is located, then read the file in, parse it, and return a pointer to the requesting application. If x.class is NOT located, then a subclass of the CLASSLOADER, a REMOTECLASS-LOADER checks if a REMOTECLASSPATH is set as indicated at a block 204. This environment variable REMOTECLASSPATH contains a set of servers 122, such as shown at block 202, HTTP://WWW.IBM.COM/JAVA APPLICATIONS:HTTP//WWW.IS1.NET, ftp locations and/or machine names and directory paths on those machines, which may contain the relevant classes. Then distributed application manager 132 checks each server 122 in sequence for the particular selected x.class file as indicated at a block 204. If the class is found, write it to the first CLASSPATH directory, thus building the class locally that the network does not have to be consulted on the next run. If the class is NOT found, then throw a not found exception. Distributed application manager 132 allows automatic updates of .class files, when a selected x.class file is found on the LOCAL machine. When the x.class file is found, the REMOTECLASSPATH is consulted to determine if a more up-to-date version of the class is available for use when the selected application is run as indicated at a block 206. The generic wrapper application which runs the updated version of the ClassLoader would then call the Runtime to allow the application to run by itself, locally as indicated at a block 208.

Figure 3:
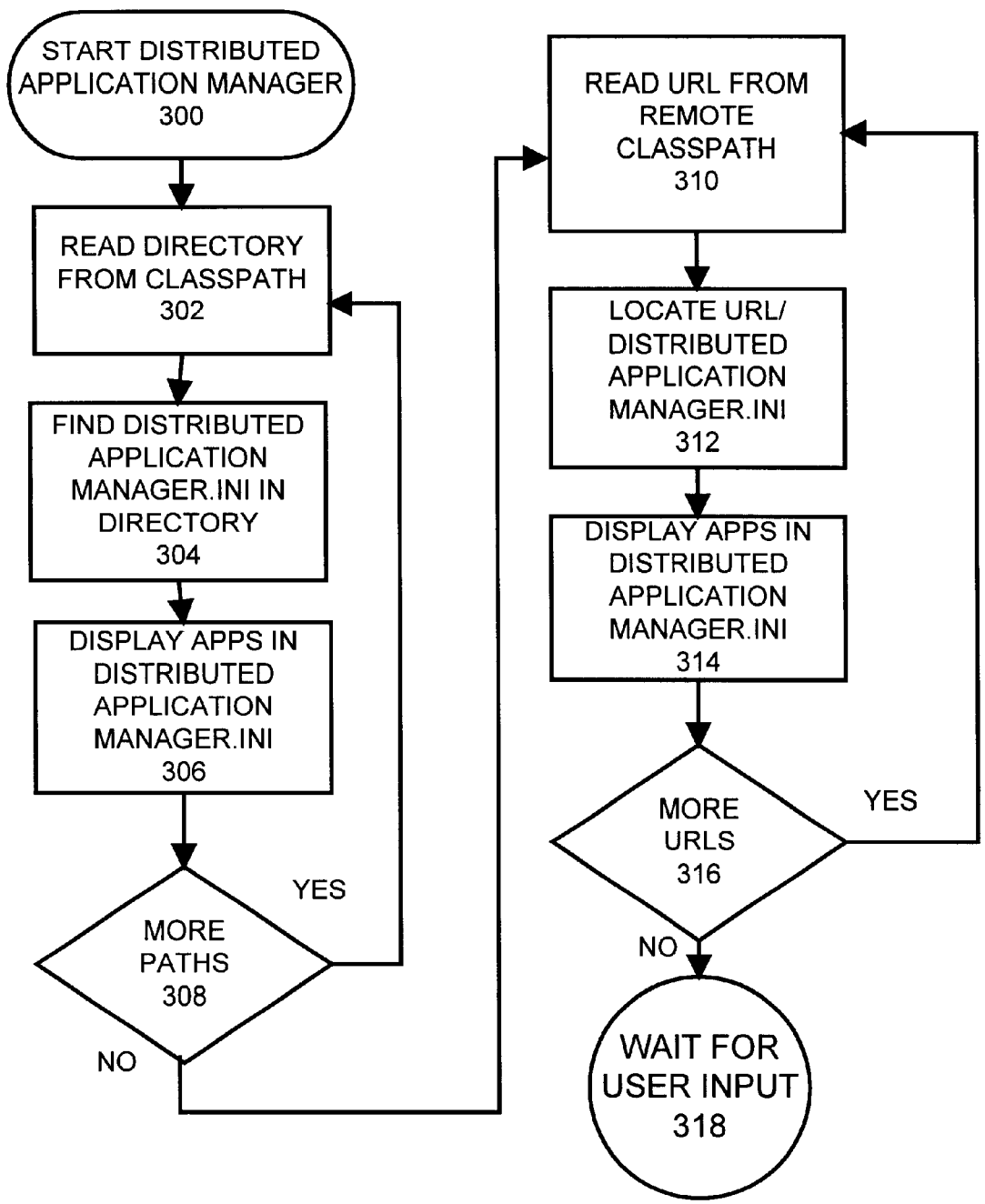
FIGS. 3 and 4 are flow charts illustrating startup and running an application in accordance with the method and computer program product of the preferred embodiment.

Referring to FIG. 3, distributed application manager 132 is started as indicated at a block 300. A directory is read from CLASSPATH as indicated at a block 302. First operation at startup is to find the distributed application manager initiating file or .INI file for distributed application manager 132 in the directory as indicated at a block 304. Distributed applications in the .INI file are displayed as indicated at a block 306. Checking for more paths is performed as indicated at a decision block 308. When more paths are identified at block 308, then the sequential operations return to block 302. Otherwise, when more paths are not identified, then a universal resource locator (URL) from a remote CLASSPATH is read as indicated at a block 310. The URL for the .INI file is located as indicated at a block 312. Distributed applications in the .INI file are displayed as indicated at a block 314. Checking for more URLs is performed as indicated at a decision block 316. When more URLs are identified at block 316, then the sequential operations return to block 310. Otherwise when more URLs are not identified, then distributed application manager 132 waits for a user input as indicated at a block 381.

Figure 4:
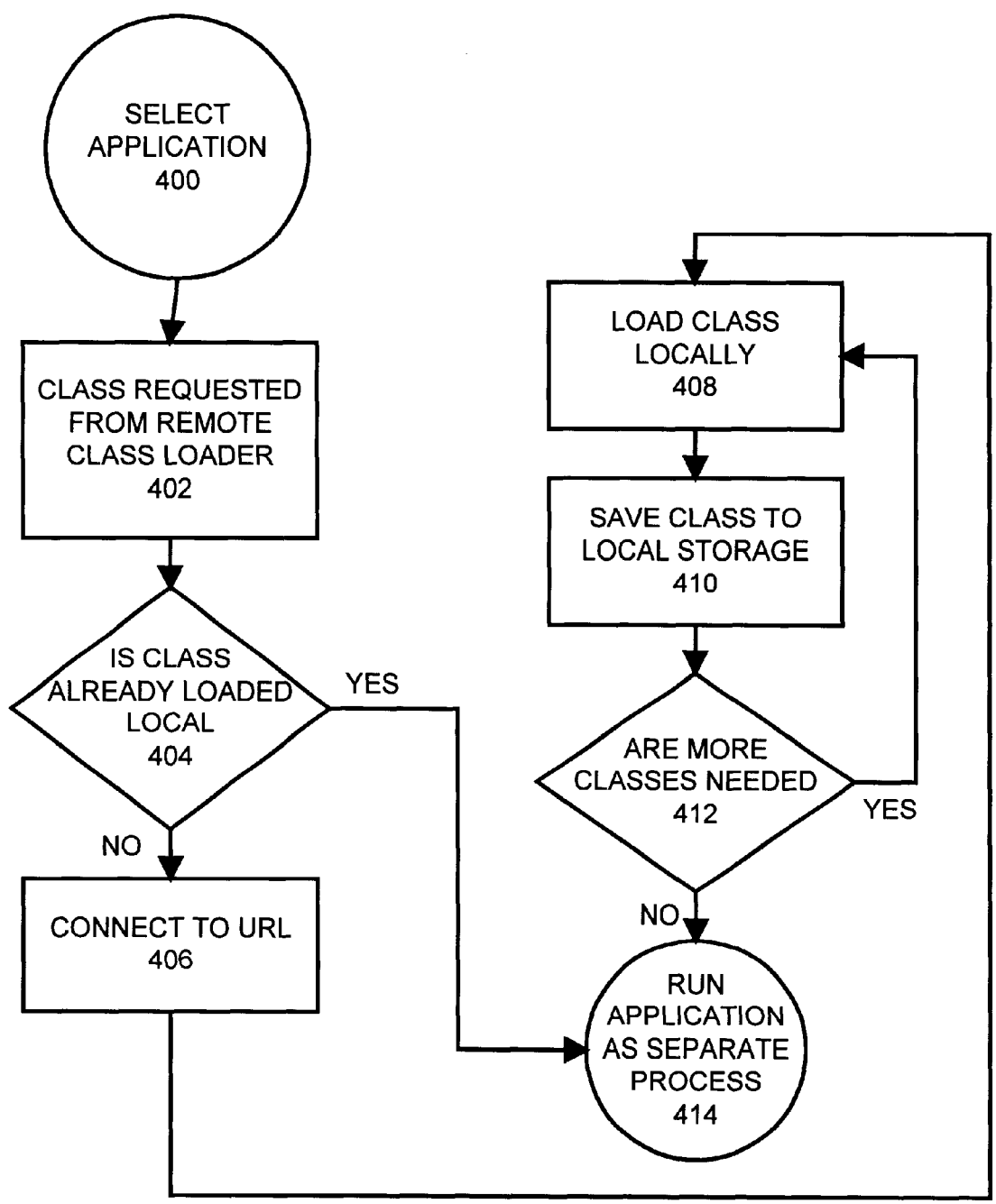

Referring now to FIG. 4, an application is selected by the user as indicated at a block 400. A CLASS is requested from the REMOTE CLASS LOADER as indicated at a block 402. Checking whether the CLASS is already loaded locally is performed as indicated at a decision block 404. When determined at block 404 that the CLASS is not already loaded on the local computer system 100, then distributed application manager 132 connects to the URL as indicated at a block 406 and the CLASS is loaded to the local computer system 100 as indicated at a block 408. The CLASS is saved to the DASD 116 of the local computer system 100 as indicated at a block 410. Checking whether more CLASSES are needed is performed as indicated at a decision block 412. When more CLASSES are needed, the sequential operations return to clock 408 to load the CLASS locally. When determined at block 404 that the CLASS is already loaded locally or at block 408 that more CLASSES are not needed, then the application is run as a separate process as indicated at a block 414.

Figure 5:
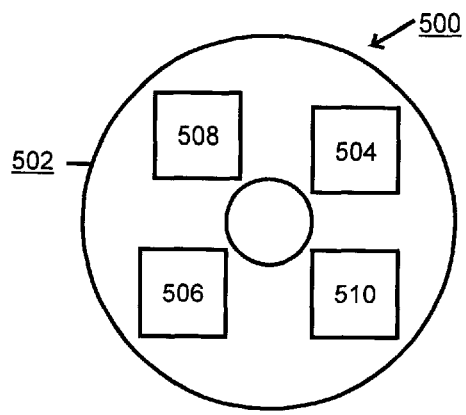
FIG. 5 is a block diagram illustrating a computer program product in accordance with the preferred embodiment.

Referring now to FIG. 5, an article of manufacture or a computer program product 500 of the invention is illustrated. The computer program product 500 includes a recording medium 502, such as, a floppy disk, a high capacity read only memory in the form of an optically read compact disk or CD-ROM, a tape, a transmission type media such as a digital or analog communications link, or a similar computer program product. Recording medium 502 stores program means 504, 506, 508, 510 on the medium 502 for carrying out the methods of the preferred embodiment in the system 100 of FIGS. 1A and 1B.

A sequence of program instructions or a logical assembly of one or more interrelated modules defined by the recorded program means 504, 506, 508, 510, direct the computer system 100 for implementing the distributed application manager 132 of the preferred embodiment.

While the present invention has been described with reference to the details of the embodiments of the invention shown in the drawing, these details are not intended to limit the scope of the invention as claimed in the appended claims.

What is claimed is:

1. A computer-implemented method performed by a distributed application manager for managing distributed applications in a local computer system, said computer-implemented method comprising the steps of:

maintaining a list of distributed applications; each said distributed application being a self-contained executable program and being arranged for use on multiple different computer platforms; and each said distributed application being arranged to run by itself without requiring a container or web browser;

presenting a user selection display containing said list of distributed applications; and responsive to receiving a user selection from said list of distributed applications, searching for the user selected distributed application on a path of servers and a path of directories in each server.

2. A computer-implemented method performed by a distributed application manager for managing distributed applications as recited in claim 1 further includes the steps of finding the user selected distributed application, downloading the user selected distributed application, and storing the user selected distributed application on the client computer system.

3. A computer-implemented method performed by a distributed application manager for managing distributed applications as recited in claim 2 further includes the step of invoking the user selected distributed application for the user.

4. A computer-implemented method performed by a distributed application manager for managing distributed applications as recited in claim 1 wherein the step responsive to receiving a user selection from said list of distributed applications, of searching for the user selected distributed application includes the step of sequentially connecting to a universal resource locator for each said server on said path of servers.

5. A computer-implemented method performed by a distributed application manager for managing distributed applications as recited in claim 1 wherein the step of maintaining said list of distributed applications includes the steps of reading a directory from a classpath on a client computer system.

6. A computer-implemented method performed by a distributed application manager for managing distributed applications as recited in claim 5 further includes the steps of reading a path of servers in said directory and finding a distributed application manager initiating file and displaying distributed applications included in the distributed application manager initiating file.

7. A computer program product for use in a computer system for managing distributed applications, the computer program product comprising:

a recording medium;

means, recorded on the recording medium, for maintaining a list of distributed applications; each said distributed application being a self-contained executable program and being arranged for use on multiple different computer platforms; and each said distributed application being arranged to run by itself without requiring a container or web browser;

means, recorded on the recording medium, for presenting a user selection display containing said list of distributed applications; and means, recorded on the recording medium, responsive to receiving a user selection from said list of distributed applications, for searching for the user selected distributed application on a path of servers and a path of directories in each server.

8. A computer program product for use in a computer system for managing distributed applications as recited in claim 7 further includes means, recorded on the recording medium, for finding the user selected distributed application, and for downloading the user selected distributed application.

9. A computer program product for use in a computer system for managing distributed applications as recited in claim 8 further includes means, recorded on the recording medium, for storing the user selected distributed application on the client computer system.

10. A computer program product for use in a computer system for managing distributed applications as recited in claim 8 further includes means, recorded on the recording medium, for invoking the user selected distributed application for the user.

11. A distributed application manager for managing distributed applications in a local computer system comprising:

means for maintaining a list of distributed applications;

each said distributed application being a self-contained executable program and being arranged for use on multiple different computer platforms; and each said distributed application being arranged to run by itself without requiring a container or web browser;

means for presenting a user selection display containing said list of distributed applications;

means, responsive to receiving a user selection from said list of distributed applications, for searching for the user selected distributed application on a path of servers and a path of directories in each server; and means, responsive to finding the user selected distributed application, for downloading the user selected distributed application, and for storing the user selected distributed application on the local computer system.

12. A distributed application manager for managing distributed applications in a local computer system as recited in claim 11 further includes means, responsive to finding the user selected distributed application, for invoking the user selected distributed application for the user.

* * * * *